US009638795B2

(12) United States Patent
Ahmed (10) Patent No.: US 9,638,795 B2
(45) Date of Patent: May 2, 2017

(54) DEVICE FOR THE MEASUREMENT OF MICROWAVE SIGNALS AND A METHOD FOR THE CONFIGURATION OF THE SAME (71) Applicant: Rohde & Schwarz GmbH & Co. KG, Munich (DE)

(72) Inventor: Sherif Ahmed, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 718 days.

(21) Appl. No.: 14/134,458

(22) Filed: Dec. 19, 2013

(65) Prior Publication Data
US 2014/0167784 A1   Jun. 19, 2014

(30) Foreign Application Priority Data
Dec. 19, 2012  (DE) .......................... 10 2012 223 696

(51) Int. Cl.
*G01R 27/04* (2006.01)
*G01S 13/89* (2006.01)
(Continued)

(52) U.S. Cl.
CPC ............ *G01S 13/89* (2013.01); *G01S 13/003* (2013.01); *H01Q 9/0407* (2013.01);
(Continued)

(58) Field of Classification Search
CPC ..... G01S 13/89; G01S 13/003; H01Q 9/0407; H01Q 21/0006; H01Q 21/065
See application file for complete search history.

(56) References Cited

U.S. PATENT DOCUMENTS

2007/0075889 A1   4/2007  Sheen et al.
2014/0125517 A1*  5/2014  Ahmed ................... G01S 7/411
                                                342/25 A

FOREIGN PATENT DOCUMENTS

DE    10 2011 005 145 A1    9/2012
WO       2007045026 A1      4/2007
WO      WO2012/167847     * 12/2012

OTHER PUBLICATIONS

Great Britain Examination Report issued in counterpart application No. GB1322469.6 on Feb. 23, 2016.
(Continued)

*Primary Examiner* — Daniel Miller
(74) *Attorney, Agent, or Firm* — Carter, DeLuca, Farrell & Schmidt, LLP (57) ABSTRACT A method for the configuration of a multi-static measuring device with an antenna arrangement, which is formed from several antenna clusters, each of which comprises several transmitting antennas and several receiving antennas, is characterized by the formation of configuration groups and associated group apertures. A configuration group is configured through the allocation of a subset of the antenna clusters of the antenna arrangement to a configuration group. At least one subset of the antenna clusters of this configuration group is configured as a receiving cluster in which exclusively the receiving antennas are activated. At least one subset of the antenna clusters of the configuration group are configured as transmitting clusters by activating the transmitting antennas. Microwave signals radiated from all transmitting antennas of all transmitting clusters of the configuration group and reflected on an object are measured in every receiving antenna of the receiving clusters of the configuration group.

19 Claims, 4 Drawing Sheets

(51) Int. Cl.
*H01Q 9/04* (2006.01)
*H01Q 21/06* (2006.01)
*H01Q 21/00* (2006.01)
*G01S 13/00* (2006.01)
*G01S 13/02* (2006.01)

(52) U.S. Cl.
CPC ....... *H01Q 21/0006* (2013.01); *H01Q 21/065* (2013.01); *G01S 2013/0245* (2013.01); *Y10T 29/49004* (2015.01)

(56) References Cited

OTHER PUBLICATIONS

Ahmed, S. S. et al., A Novel Fully Electronic Active Real-Time Imager Based on a Planar Multistatic Sparse Array. In: IEEE Transactions on Microwave Theory and Techniques, vol. 59, No. 12, Dec. 2011, pp. 3567-3576.

Ahmed, S. S. et al., A Novel Active Real-Time Digital-Beamforming Imager for Personnel Screening. In: Synthetic Aperture Radar, 2012. EUSAR. 9th European Conference, Apr. 23-26, 2013, pp. 178-181.

Schiessl, A. et al., Hardware Realization of a 2 m x 1 m Fully Electronic Real-Time mm-Wave Imaging System. In: Synthetic Aperture Radar, 2012, EUSAR. 9th European Conference, Apr. 23-26, 2012, pp. 40-43.

Preliminary Search Report issued in corresponding application No. FR 1362864 on Nov. 21, 2016.

\* cited by examiner

DEVICE FOR THE MEASUREMENT OF MICROWAVE SIGNALS AND A METHOD FOR THE CONFIGURATION OF THE SAME

FIELD OF THE INVENTION

The invention relates to a device for the multi-static measurement of microwave signals with an antenna arrangement which comprises several antenna clusters and a method for the configuration of the device.

Devices for the multi-static measurement of microwave signals, also often designated as millimeter-wave scanners, are used, for example, for material investigation or as body scanners. In the case of a multi-static measurement, an antenna element transmits microwave signals, which, after reflection on an object under investigation, are received in all receiving antennas. In succession or also in parallel, each of the available transmitting antennas transmits a signal which is received by all receiving antennas and subsequently evaluated. The phase and amplitude of the received signals are determined, and, for example, through a software-based algorithm, the reflecting spatial point is investigated. Accordingly, a plurality of measured data in a spatial region is collected, so that an accurate image of an object within this region can be reconstructed.

BACKGROUND OF THE INVENTION

A millimeter-wave scanner which operates according to the described multi-static measurement method is known from DE 10 2011 005 145 A1. This millimeter scanner comprises an antenna arrangement which is constructed from one or more antenna clusters. In this context, an antenna cluster comprises several transmitting antennas which are arranged within a predetermined region, and a number of receiving antennas which are arranged in another region. Through the interconnection of several antenna clusters, a relatively larger opening width, also referred to as aperture, of the antenna arrangement is obtained, so that a relatively larger spatial region can be investigated, without the spatial position of an antenna cluster needing to be changed.

The disadvantage with such a measuring device is that an immensely large number of measured values, which result from the number of the combinations of every transmitting antenna with every receiving antenna, are measured, and accordingly place heavy demands on the measurement electronics and evaluation capacity. The latter requires, in particular, a high computational capacity in the evaluation unit and is associated with high costs for the measuring device and/or a long evaluation time.

Accordingly, an object of the present invention is to provide a device for the measurement of microwave signals and a method for its configuration, which allows the preparation of an image with relatively low computational costs and is accordingly cost favourable and time efficient.

BRIEF SUMMARY OF THE INVENTION

The method according to the invention for the configuration of a measuring device with an antenna arrangement which is formed from several antenna clusters, whereas each antenna cluster comprises several transmitting antennas and several receiving antennas is characterised by the formation of configuration groups and associated group apertures. In this context, a configuration group is configured through allocation of a subset of the antenna clusters of the antenna arrangement to a configuration group. At least one subset of the antenna clusters of the configuration group in this context is configured as receiving cluster, in that exclusively the receiving antennas of the antenna cluster are activated, and at least a subset of the antenna clusters of the configuration group are configured as transmitting cluster through activation of the transmitting antennas. The microwave signals radiated from all transmitting antennas of all transmitting clusters of the configuration group and reflected on an object are measured in every receiving antenna of the receiving cluster of the configuration group.

In this manner, the number of signals to be evaluated is reduced, since the number of transmitter-receiver combinations is reduced through the relatively lower number of the transmitting and receiving antennas. Accordingly, through the number and arrangement of the antenna clusters in a configuration group, a group aperture is obtained, which is available for the detection of an object. The antenna arrangement respectively the active part of the antenna arrangement can thus be matched in an advantageous manner to the size and position of the object under investigation. Apertures with different size and contour can be formed, especially through the combination of several configuration groups. The measurement and evaluation cost and the duration for the preparation of an image are therefore reduced.

An advantageous further development is achieved if only a single antenna cluster of the configuration group is configured as receiving cluster. In particular, this allows the formation of a unified raster of measured points, so that a simple evaluation and combination of several images prepared from individual configuration groups is possible.

It is particularly advantageous if the transmitting antennas and the receiving antennas of one antenna cluster are arranged in such a manner that the totality of the mid-points of the paths which are plotted from every transmitting antenna of the antenna cluster to every receiving antenna of an antenna cluster form a two-dimensional raster which provides, in each case, identical spacing distances in one direction of extension, so that an effective aperture is plotted through the totality of the mid-points. In particular, such an aperture allows a homogenous imaging of the object under investigation.

It is an advantageous embodiment, if the transmitting clusters and the receiving cluster respectively receiving clusters of a configuration group are arranged in an arbitrary two-dimensional raster which provides identical spacing distances in each case in one direction of extension. Through a corresponding raster-shaped arrangement of the transmitting and receiving clusters in a configuration group, an effective aperture of the configuration group can in turn be generated in a simple manner.

In one advantageous embodiment, several configuration groups are configured and arranged spatially in such a manner that all group apertures of the individual configuration groups together form a common, coherent aperture without gaps. Accordingly, for example, the aperture of an antenna arrangement which, as described in the prior art, has been transmitted respectively from all transmitting antennas and received by all receiving antennas, can be simulated through a measurement of the signals. In this context, a multiple of the computational power is saved, since only the receiving antennas, for example, of the one receiving cluster of a configuration group, are combined respectively measured with the transmitting antennas of a subset of the antenna clusters of the total antenna arrangement.

For every individual configuration group, an image of the object is advantageously reconstructed through coherent correlation of the microwave signals radiated from all transmitting antennas of all transmitting clusters of a configuration group reflected on an object and received in every receiving antenna of the receiving cluster of a configuration group. Accordingly, the images of several configuration groups can be reconstructed in parallel and accordingly completely separately from one another, and the evaluation duration can be optimised.

In one advantageous embodiment, the image for spatial points of a predefined, always identical spatial grid is reconstructed for every configuration group. This has the advantage that, in the case of the fitting together of the images of various adjacent configuration groups, images without spatial offset are obtained.

It is also advantageous if the microwave signals measured in an overlapping region of the apertures of several configuration groups are weighted with a weighting factor. In the case of an overall image which is combined from images from several configuration groups, this leads to a uniform "brightness", because every measured point is based upon the same number of measurements.

It is also advantageous if a reflector element is arranged near the antenna arrangement, parallel to the edge of one or more transmitting clusters and/or perpendicular to the group-aperture plane, and the microwave signals reflected from the reflector element are measured and reconstructed as from virtual transmitting antennas of a transmitting cluster reflected on the reflector element.

The device according to the invention for multi-static measurement of microwave signals comprises an antenna arrangement, a control unit and an evaluation unit. The antenna arrangement comprises several antenna clusters, whereas each antenna cluster provides several transmitting antennas and several receiving antennas. The control unit is embodied in such a manner that a subset of the antenna clusters can be allocated to one configuration group; at least one subset of the antenna clusters of the configuration group is configurable as receiving cluster through activation of the receiving antennas of the antenna cluster; at least one subset of the antenna clusters of the configuration group is configurable as transmitting cluster through activation of the transmitting antennas; and the evaluation unit is embodied in such a manner that the microwave signals radiated from all transmitting antennas of all transmitting clusters of the configuration groups and reflected on an object are measured in every receiving antenna of the receiving clusters of the configuration group. This allows a matching of the aperture of the measuring device to the respective object under investigation respectively significantly reduces the loading of the evaluation unit.

In one advantageous embodiment, the transmitting antennas and the receiving antennas of one antenna cluster of the measuring device are arranged in such a manner that the totality of the mid-points of the paths which are plotted from every transmitting antenna of the antenna cluster to every receiving antenna of the antenna cluster form a two-dimensional raster which provides identical spacing distances in each case in one direction of extension.

It is an advantageous embodiment of the measuring device, if the receiving antennas in one antenna cluster are arranged in two regions arranged parallel to one another, and the transmitting antennas are arranged in two parallel regions perpendicular to the receiving antennas in the form of a rectangular, preferably a square, frame. It is a further advantageous exemplary embodiment of an antenna cluster if the receiving antennas are arranged in a rectangular, preferably a square, region, and one or more transmitting antennas are arranged in each case outside every corner of the rectangular, preferably square, region. An antenna cluster of inverted shape, in which the transmitting antennas are arranged in a rectangular, preferably square, region and the receiving antennas are arranged outside every corner of the square region, is also advantageous.

An antenna cluster in which regions with transmitting antennas and regions with receiving antennas are arranged offset relative to one another in the manner of a chessboard is also advantageous.

It is particularly advantageous, if the transmitting antennas in an antenna cluster are arranged point symmetrically relative to a mid-point of the antenna cluster, and the receiving antennas are arranged in the same form but rotated by 90° to the latter.

All of the named embodiments of the antenna cluster each form a dense, effective aperture, which, combined to form a configuration group, in turn provide an effective aperture. Accordingly, a uniform scanning of the object to be investigated is guaranteed.

A particularly advantageous embodiment of the device is achieved if a reflector element is arranged near to the antenna arrangement parallel to the edge of one or more antenna clusters and perpendicular to the group-aperture plane of a configuration group, and the evaluation unit is embodied in such a manner that the microwave signals reflected from the reflector element are assumed and reconstructed as radiated from virtual transmitting antennas of a transmitting cluster reflected on the reflector element. This allows the aperture to be expanded beyond the aperture of the overall physical antenna arrangement and accordingly allows the object under investigation to be investigated from a wider viewing angle. This is possible without additional transmitting antennas respectively transmitting clusters, only through the reflector element.

The reflector element is advantageously arranged at a spacing distance, which corresponds to half of a raster spacing distance between adjacent transmitting clusters, from a transmitting cluster of the configuration group adjacent to the reflector element. With the named spacing distance, the antenna arrangement and, in particular, the configuration group appear expanded by one or more virtual transmitting clusters which are arranged corresponding to the raster of the antenna arrangement respectively the configuration.

BRIEF DESCRIPTION OF THE DRAWINGS

Exemplary embodiments of the method according to the invention and the device according to the invention are illustrated by way of example in the drawings and will be explained in greater detail on the basis of the following description. The drawings show.

DETAILED DESCRIPTION OF EMBODIMENTS OF THE INVENTION

Figure 1A:
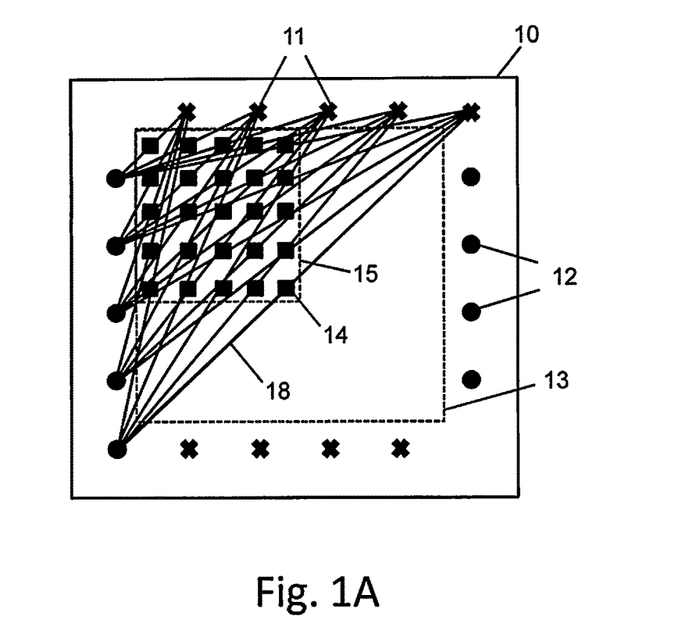
FIG. 1A a first exemplary embodiment of an antenna cluster according to the invention and an aperture area plotted from the latter in plan view.
Figure 1B:
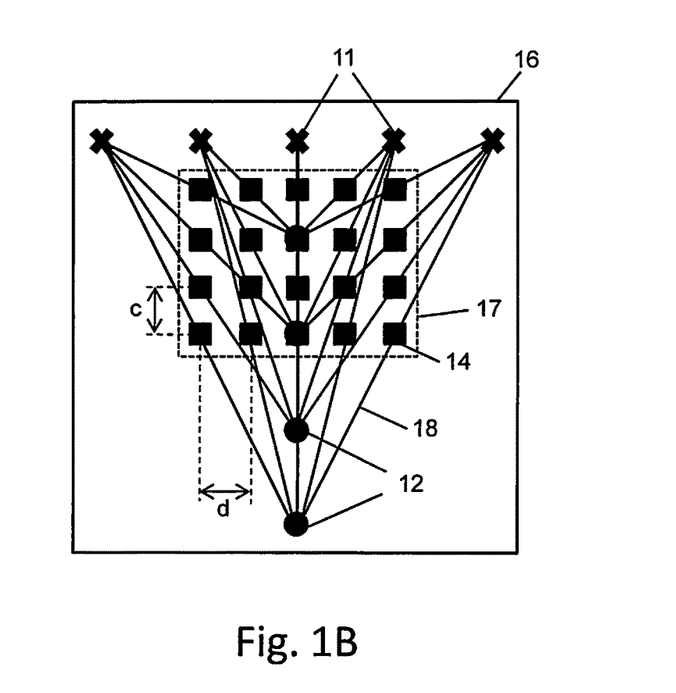
FIG. 1B a second exemplary embodiment of an antenna cluster according to the invention and an aperture area plotted from the latter in plan view.
Figure 7:
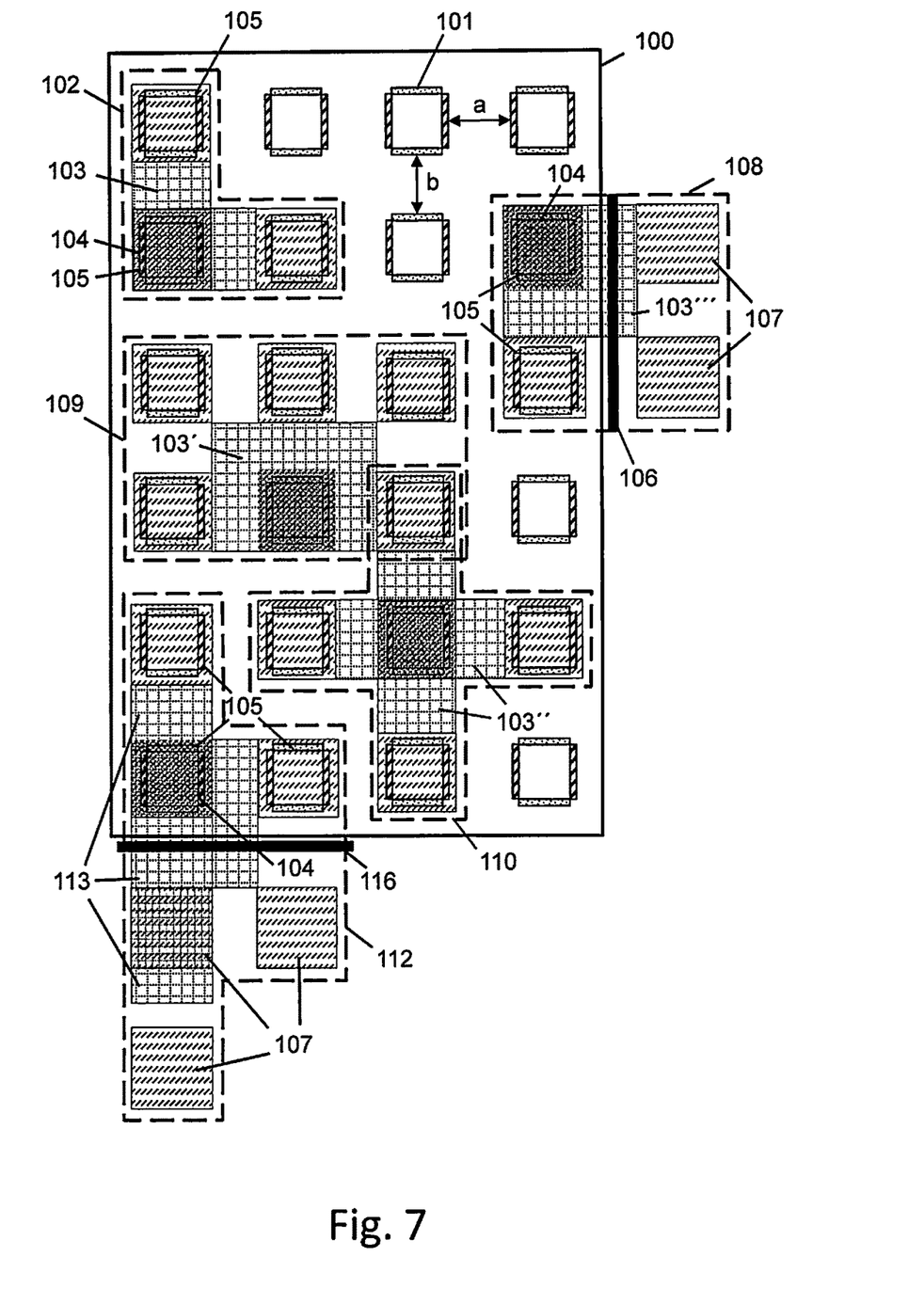
FIG. 7 an exemplary embodiment according to the invention of an antenna arrangement with configuration groups in schematic presentation.
Figure 8:
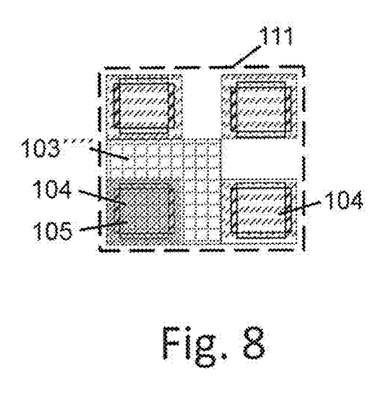
FIG. 8 a first exemplary embodiment of a configuration group as a basis for a combined overall aperture of an antenna arrangement in schematic presentation.
Figure 9:
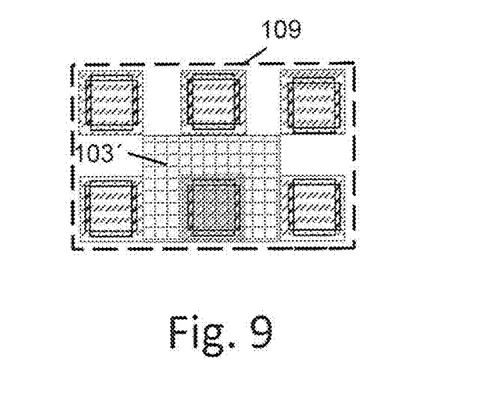
FIG. 9 a second exemplary embodiment of a configuration group corresponding to FIG. 8.

On the basis of FIG. 1A and FIG. 1B, it will be explained how an effective aperture is obtained from the arrangement of the transmitting and receiving antennas in the case of a multi-static measurement. In FIGS. 2 to 6, advantageous embodiments are described, in each case of an antenna cluster with effective aperture as shown in FIGS. 1A and 1B. With reference to FIG. 7, the construction of configuration groups and their possible arrangement in an antenna arrangement is explained. FIGS. 8 and 9 show favourable configuration groups for forming an aperture covering the overall antenna arrangement. Finally, the construction of a corresponding measuring device will be explained with reference to FIG. 10.

FIG. 1 shows an antenna cluster 10 with several receiving antennas 11, which are arranged at identical spacing distances in a row. Perpendicular to this, also in a row, transmitting antennas 12 are arranged at an identical spacing distance from one another. An effective aperture area is defined through the mid-points 14 of the paths 18 which are plotted between each of the possible transmitting/receiving antenna combinations. In FIG. 1, this is illustrated for all combinations of the upper five receiving antennas 11 with the five lateral transmitting antennas 12 on the left side. In this context, the mid-points 14 are marked in each case by black squares. These plot an effective aperture area 15. An antenna cluster with four further receiving antennas arranged parallel to the upper five receiving antennas 11 and four transmitting antennas 12 parallel to the transmitting antennas 12 illustrated on the left side results in an effective aperture area 13.

FIG. 1B shows antenna cluster 16 with five receiving antennas 11, which are arranged horizontally in a row and with identical spacing distances. Perpendicular to the receiving antennas 11, several transmitting antennas 12 are arranged in a row with identical spacing distances and in horizontal direction, centrally below the receiving antennas 11. An effective aperture area 17 is obtained here from the mid-points 14 of the paths 18 between every transmitting/receiving antenna combination.

An effective aperture is given, if the mid-points 14 of the paths 18 in each case provides the identical spacing distance in one direction of extension, whereas the spacing distances in different directions of extension, for example, x and y, can be the same or different in size. Accordingly, the spacing distance between the mid-points 14 in the y-direction illustrated in FIG. 2 can correspond to a value c. The spacing distance d between respectively adjacent mid-points in the x-direction is also identical but can provide a different value from the spacing distance c of the mid-points in the y-direction.

Figure 2:
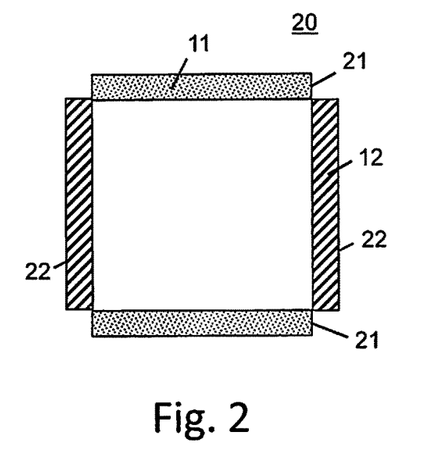
FIG. 2 a third exemplary embodiment of an antenna cluster according to the invention in schematic presentation.

FIG. 2 shows an exemplary embodiment of an antenna cluster 20, in which, in a similar manner to FIG. 1, transmitting antennas 12 are arranged in mutually parallel, opposite regions 22, and receiving antennas 11 are arranged perpendicular to the latter in each case, in regions 21 arranged mutually parallel, corresponding to the sides of a rectangular, preferably a square, frame. The transmitting antennas 12 in a region 22 with transmitting antennas 12 can, in this context, be arranged, for example, in one or more parallel rows. However, the transmitting antennas 12 can also be arranged therein in another regular arrangement. Correspondingly, a number of receiving antennas 11 are disposed in the region 21 with exclusively receiving antennas 11 which are arranged in the same or also a different manner as the transmitting antennas 12 in the region 22.

Figure 3:
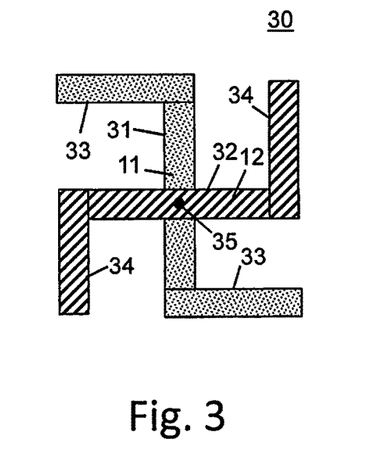
FIG. 3 a fourth exemplary embodiment of an antenna cluster according to the invention in schematic presentation.

FIG. 3 shows a further exemplary embodiment of an antenna cluster 30, in which the transmitting antennas 12 are arranged point symmetrically relative to a mid-point 35 of the antenna cluster 30, and the receiving antennas 11 are arranged in the same form but rotated by 90° to the latter. In this context, for example, a region 32 with transmitting antennas is arranged horizontally. At the ends of the region 32, shorter transmitting antenna regions 34 are positioned, rotated by 90°, each pointing in opposite direction. A region 31 with receiving antennas is arranged rotated by 90° to the latter about a mid-point 35 of the horizontally arranged region 32 with transmitting antennas. At the ends of the region 31, shorter receiving-antenna regions 33 are arranged rotated by 90°, pointing in each case in opposite direction.

Figure 4:
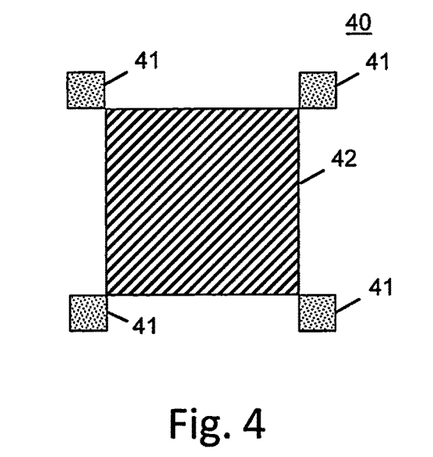
FIG. 4 a fifth exemplary embodiment of an antenna cluster according to the invention in schematic presentation.
Figure 5:
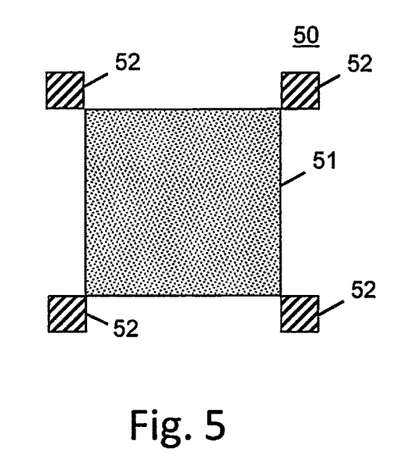
FIG. 5 a sixth exemplary embodiment of an antenna cluster according to the invention in a schematic presentation.

FIG. 4 shows an exemplary embodiment of an antenna cluster 40, in which transmitting antennas are arranged in a rectangle, preferably square, central region 42, and outside every corner, adjoining the latter in each case, a region 41 with receiving antennas is embodied. The region 42 with transmitting antennas preferably comprises several transmitting antennas which are arranged, for example, in a raster shape within it. The region 41 with receiving antennas preferably comprises one receiving antenna, but can also comprise several receiving antennas. In FIG. 5, receiving antennas are arranged, for example, in the central region 51. The regions 52 adjoining at every corner contain transmitting antennas. Otherwise, both embodiments of antenna clusters correspond to one another.

Figure 6:
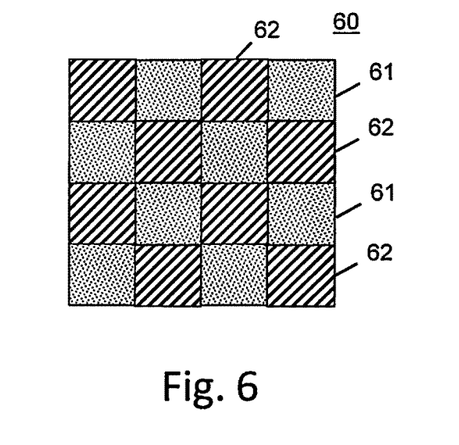
FIG. 6 a seventh exemplary embodiment of an antenna cluster according to the invention in schematic presentation.

FIG. 6 shows a chessboard-like, structured antenna cluster 60 with regions with receiving antennas 61 and regions with transmitting antennas 62 arranged in each case in alternation in the x-direction and y-direction. Each region can provide one or more receiving respectively transmitting antenna.

Alongside the described arrangements, antenna clusters are usable, in which the transmitting antennas 11 are arranged point symmetrically relative to a mid-point of the antenna cluster, and the receiving antennas are arranged in the same form as the transmitting antennas, but rotated about the mid-point by 90° relative to it. In common with all of the described exemplary embodiments of antenna clusters 20, 30, 40, 50, 60 is the fact that an effective aperture is plotted by the transmitting and receiving antennas.

FIG. 7 now shows an exemplary embodiment according to the invention of an antenna arrangement 100 in which several antenna clusters 101 are arranged in a regular raster in one plane. By way of example, an antenna cluster 20 illustrated in FIG. 2 is shown as the antenna cluster 101. However, an arbitrary antenna cluster, forming an effective aperture, and especially an embodiment of the described antenna clusters 30, 40, 50, 60, can be used for the embodiment of the antenna arrangement. By preference, exclusively an embodiment of an antenna cluster 101 is used in an antenna arrangement 100. The spacing distances a between the individual antenna clusters 101 in this context are always identical in a first direction of extension. Similarly, the spacing distance b between the antenna clusters 101 is identical in a second direction of extension. In this context, the spacing distances a and b in different directions of extension need not necessarily be identical. By preference, the spacing distance a between the antenna clusters 101 corresponds to the spacing distance between horizontally arranged transmitting respectively receiving antennas in the antenna cluster itself, and the spacing distance b between the antenna clusters 101 corresponds to the spacing distance between perpendicularly arranged, receiving respectively transmitting antennas in the antenna cluster 101 itself.

Hitherto, in the case of multi-static measurement with such antenna arrangements 100, it is conventional that, in every individual receiving antenna 12, in every case, the microwave signals radiated from all transmitting antennas 11 are measured in reflection and then evaluated for the reconstruction of the object in an image. As a result of the large number of transmitting/receiving antenna combinations, a heavy evaluation load occurs, which, once again, leads to heavy demands on the process capacities in the evaluation unit or is respectively associated with high costs or requires longer evaluation times. Conversely, in the case of an object which provides a small extension by comparison with the aperture of the antenna arrangement, a considerably larger volume range is scanned and reconstructed than is occupied by the object. Both disadvantages are remedied by the formation of one or more configuration groups 102.

A configuration group 102 is formed through the allocation of a subset of antenna clusters 101 of the antenna arrangement 100 to a configuration group 102. Furthermore, at least one subset of the antenna clusters of the configuration group 102 is configured as receiving cluster 104 through activation of the receiving antennas of the antenna cluster 101. Correspondingly, at least one subset of the antenna cluster 101 of the configuration group 102 is configured as transmitting cluster 105 through activation only of the transmitting antennas. Following this, the multi-static measurement of the microwave signals, which have been radiated from all transmitting antennas 11 of all transmitting clusters 105 of the configuration group 102 and received in every receiving antenna 12 of a receiving cluster 104 of the configuration group 102, is implemented.

FIG. 7 shows various configuration groups 102, 108, 109, 110 with different contour. The configuration group 102 is formed, for example, from precisely one receiving cluster 104 and two receiving clusters 105. The receiving cluster 104 can also be additionally configured as transmitting cluster 105, in which the transmitting antennas are also activated in addition to the receiving antennas of the antenna cluster. A transmitting cluster 105 is configured, in that only the transmitting antennas of the antenna cluster 101 are activated. The receiving antennas are deactivated. This results in an angled aperture 103. Transmitting clusters 105 are characterised in FIGS. 7, 8 and 9 in each case with interrupted shading. A receiving cluster 104 is configured, in that only the receiving antennas are activated, the transmitting antennas are deactivated. The receiving clusters 104 in FIGS. 7, 8 and 9 are each characterised by a dense shading.

A further configuration group 109 comprises, for example, five transmitting clusters 105 and one receiving cluster 104. In the case of a multi-static measurement between the transmitting antennas of all transmitting clusters 105 of the configuration group 109 with all receiving antennas of the receiving cluster 104, a rectangular aperture 103' is plotted around the receiving cluster 104 between the adjacent transmitting clusters. The aperture area is illustrated in each case with checked shading. A further cruciform configuration group 110 is formed from four transmitting clusters and one receiving cluster 104. The groups of the aperture 103" generated as a result also corresponds to a cruciform area. Here also, the receiving cluster 104 is preferably also configured as a transmitting cluster 105. One or more transmitting clusters 105 can be allocated simultaneously to several configuration groups, as is the case, for example, with configuration group 109 and 110.

In one configuration group 108, a reflector element 106 is arranged parallel to the edge of two transmitting clusters 105 and perpendicular to the plane of the antenna arrangement 100 respectively to the group aperture 103'''. The microwave signals radiated from the transmitting antennas of the transmitting clusters 105 are reflected on the reflector element 106, so that the signals appear to be radiated from a reflected, virtual transmitting cluster 107. As a result, two virtual transmitting clusters 107 are obtained, which are taken into consideration in the evaluation respectively reconstruction of the image as real transmitting clusters at the indicated, reflected position. The evaluation function can be applied to these reflected, virtual transmitting antennas without further modification. The measured values obtained from this can be subjected to a weighting factor. Such a weighting factor can, for example, compensate the relatively lower signal amplitude from reflection losses. The group aperture of such a configuration group 108 extends beyond the physical edge of the antenna arrangement 100 and therefore expands the aperture of the overall antenna arrangement 100.

A further exemplary configuration group 112 is illustrated in the lower corner region of the antenna arrangement. The configuration group 112 is formed by an arrangement of one receiving cluster 104 and three transmitting clusters 105 corresponding to the configuration group 102. A reflector element 116 with a flat reflecting surface is arranged here parallel to the lower edge of the antenna arrangement 100 and the transmitting cluster 105 respectively receiving cluster 104 arranged parallel to the latter and perpendicular to the plane of the antenna arrangement 100. Corresponding to the above embodiments, three additional, virtual transmitting clusters 107, which achieve an illumination of the object under investigation expanded downwards, are obtained through the reflector element 116. The plotted aperture area 113 covers the area between the receiving cluster 104 and the two real receiving clusters 105 and the areas between the receiving cluster 104 and the reflected, virtual receiving clusters 107. Several reflector elements 106, 116 can be used at the same time. The reflector element 106, 116 can extend over one or more antenna clusters 101 and can be arranged in, respectively near to, a lateral and/or upper and/or lower edge of the antenna arrangement 100 respectively of the antenna cluster 101.

For every individual configuration group 102, 108, 109, 110, 112, an image is reconstructed through coherent correlation of the signals of all transmitting/receiving antenna combinations and frequencies for one spatial region. As an underlying algorithm, a back-propagation algorithm corresponding to the formula $$R(x, y, z) = \sum_{f=1}^{n_F} \sum_{t_x=1}^{n_T} \sum_{r_x=1}^{n_R} M(f, t_x, r_x) \cdot e^{+j\frac{2\pi}{c_0}f|\vec{r}_{voxel} - \vec{r}_{t_x}|} \cdot e^{+j\frac{2\pi}{c_0}f|\vec{r}_{r_x} - \vec{r}_{voxel}|}$$

can be used by way of example. In this context, M denotes the received microwave signal, $t_x$ and $r_x$ denote the position of a receiving antenna 12 and transmitting antenna 11 of the antenna arrangement 100. Accordingly, a reflection value R is allocated to every object point (x,y,z) in the three-dimensional space.

The reconstruction of the image is reconstructed for all configured configuration groups 102, 108, 109, 110, 112 for a defined spatial region. This is predefined and comprises the identical spatial points. If the apertures of adjacent configuration groups overlap, before the reconstruction of the image points, the corresponding region is corrected through a weighting function, so that, in the case of an image calculated from several configuration groups, which then, in combination, form an overall image of the object, a uniform weighting of every spatial point is given. Alternatively, a weighting factor can be applied only to the overlapping image points in the case of the subsequent fitting together of the individual image after the reconstruction of the image of an individual configuration group 102, 108, 109, 110, 112.

In order to measure an object which is disposed, for example, in the lower region in front of the antenna arrangement 100, efficiently with regard to evaluation capacity and evaluation duration, one or more configuration groups which only provide antenna clusters 101 in the lower region of the antenna arrangement 100, can be configured. The overall aperture for such a measurement is then composed of the individual group apertures of the configured configuration groups. Accordingly, a very variable aperture 103 with regard to size and contour can be configured. This can be individually matched to the shape and size and position of the object under investigation.

Several configuration groups which do not plot coherent apertures can also be configured, for example, in order to investigate a region of the leg and a region on the upper body of a person to be scanned. This allows a very efficient use both of the evaluation unit and also of the processors contained therein and/or reduces the duration of the measurement. Furthermore, the radiated transmission power is reduced and the energy consumption is therefore reduced.

Conversely, a plurality of configuration groups can be configured in such a manner that the individual group apertures together cover the entire area of the antenna arrangement and accordingly simulate the aperture of a conventional antenna arrangement. By way of difference from a conventional aperture in which, as already mentioned, every individual transmitting antenna is combined with every individual receiving antenna of the entire antenna array, the number of combinations is reduced through the use of configuration groups. For example, if a configuration group 111, see FIG. 8, is configured from three respectively four transmitting clusters 105 and one receiving cluster 104, a group aperture 103'''' is plotted, which covers the area of the transmitting cluster 104 and extends in each case up to the edge of the adjacent transmitting cluster. The entire area of the antenna arrangement respectively its aperture can be simulated through configuration groups 111, whereas, in each case, a configuration group 111 is configured for every antenna cluster 101 of the antenna arrangement.

In the case of a conventional measurement between all transmitting and receiving antennas 11, 12 of the antenna clusters 101 of the antenna arrangement 100, for example, with 24 antenna clusters, an evaluation load is obtained which corresponds to a value of 24×24. By contrast, the evaluation load with a formation of the aperture from 24 configuration groups 111 corresponds only to a value of 24×4. Accordingly, the evaluation load is reduced by the factor 6. The images which have been reconstructed from the individual configuration groups, are fitted together to form a single three-dimensional image. The reduced number of measurements leads to a poorer signal-noise ratio. However, it has been shown that, in this context, only the contrast of a reconstructed image is reduced, however, the imaging quality is not significantly poorer.

For example, an aperture of the entire antenna arrangement 100 can also be simulated from configuration groups 109 in each case with six receiving clusters 104 and one transmitting cluster 105, which is arranged between two transmitting clusters, see FIG. 9. In this context, an evaluation load of 24×6 is obtained instead of 24×24, so that the evaluation load is reduced by the factor 4.

However, the aperture of the overall antenna arrangement 101 can also be made up from differently formed configuration groups respectively their apertures. In this context, however, it is advantageous to consider a uniform loading of the configuration groups, since the evaluation duration of the slowest configuration group determines the duration of the overall image generation. The evaluation load and accordingly evaluation duration is scaled in a linear manner with the transmitter-receiver combinations to be taken into consideration, as is evident, especially from the exponents of the formula for the back-propagation algorithm.

Furthermore, it is possible to form configuration groups, in which the associated antenna clusters 101 are not adjacent. With such configuration groups, the crosstalk between the individual antenna clusters 101 is particularly reduced.

Figure 10:
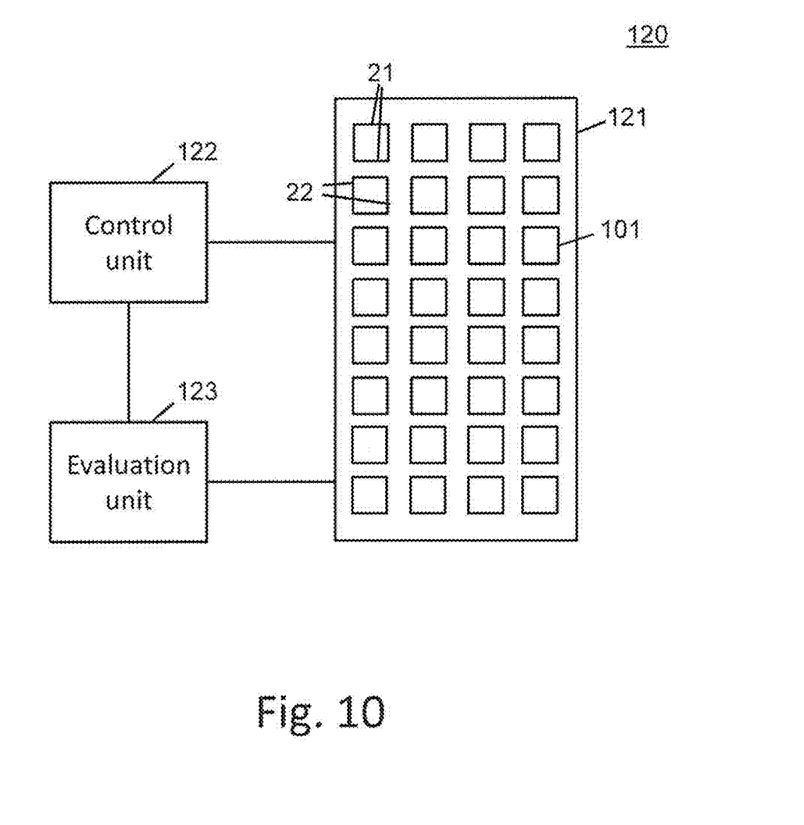
FIG. 10 an exemplary embodiment of a measuring device according to the invention in schematic presentation.

FIG. 10 now shows a schematic presentation of a corresponding measuring device 120. The measuring device 120 comprises an antenna arrangement 121, a control unit 122 and an evaluation unit 123. The antenna arrangement 121 is connected to the control unit 122 and to the evaluation unit 123, in each case via an electrical connection. The control unit 122 is also connected to the evaluation unit 123.

The antenna arrangement 121 comprises a plurality of transmitting and receiving antennas which are each grouped in antenna clusters 101. By preference, the antenna clusters 101 comprise an arrangement of the transmitting and receiving antennas corresponding to the exemplary embodiments for antenna clusters 20, 30, 40, 50, 60. The control unit 122 is embodied in such a manner that a configuration group can be prepared through allocation of several antenna clusters. The control unit 122 is embodied in such a manner that following this, a subset of the antenna cluster 101 of the configuration group can be configured as transmitting cluster 105 through activation of the transmitting antennas, and a subset of the antenna clusters 101 of the configuration group can be configured as receiving cluster 104 through activation of the receiving antennas.

The evaluation unit comprises processors and/or digital signal processors which allow the microwave signals radiated from all transmitting antennas of all transmitting clusters 105 of the configuration group and received in every receiving antenna of the receiving cluster 104 of the configuration group to be measured and evaluated. In this context, the evaluation contains the reconstruction of an image of the object under investigation on the basis of the measured data, for example, through a back-propagation algorithm. The measured microwave signals in this context are allocated to the spatial points of a predetermined spatial region with always identical spatial points.

All of the features described and/or illustrated can be advantageously combined with one another within the scope of the invention. The invention is not restricted to the exemplary embodiments described and, for example, can also be used with other antenna configurations.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A method for configuring a testing device with an antenna arrangement, which is formed from several antenna clusters, wherein each antenna cluster comprises several transmitting antennas and several receiving antennas, wherein at least one configuration group is configured and evaluated, the method comprising:
    allocating a subset of the antenna cluster of the antenna arrangement to a configuration group;
    configuring at least one subset of the antenna cluster of the configuration group as a receiving cluster by activating the receiving antennas of the respective antenna cluster;
    configuring at least one subset of the antenna cluster of the configuration group as a transmitting cluster by activating the transmitting antennas of the respective antenna cluster;
    measuring microwave signals transmitted from all transmitting antennas of all transmitting clusters of the configuration group and reflected on an object to every receiving antenna of the receiving clusters of the configuration group; and
    configuring the transmitting clusters and the receiving clusters of a configuration group in an arbitrary two-dimensional raster.

2. The method according to claim 1, wherein only a single antenna cluster of the configuration group is configured as a receiving cluster.

3. A method for configuring a testing device with an antenna arrangement, which is formed from several antenna clusters, wherein each antenna cluster comprises several transmitting antennas and several receiving antennas, wherein at least one configuration group is configured and evaluated, the method comprising:
    allocating a subset of the antenna cluster of the antenna arrangement to a configuration group;
    configuring at least one subset of the antenna cluster of the configuration group as a receiving cluster by activating the receiving antennas of the respective antenna cluster;
    configuring at least one subset of the antenna cluster of the configuration group as a transmitting cluster by activating the transmitting antennas of the respective antenna cluster; and
    measuring microwave signals transmitted from all transmitting antennas of all transmitting clusters of the configuration group and reflected on an object to every receiving antenna of the receiving clusters of the configuration group,
    wherein the transmitting antennas and the receiving antennas of an antenna cluster are arranged in such a manner that a totality of mid-points of paths which are plotted from each transmitting antenna of the antenna cluster to each receiving antenna of an antenna cluster form a two-dimensional raster, which provides identical spacing distances in each case in one direction of extension, so that an effective aperture is plotted through the totality of the mid-points.

4. The method according to claim 1, wherein the arbitrary two-dimensional raster provides identical spacing distances in each case in one direction of extension.

5. The method according to claim 1, wherein several configuration groups are configured which are arranged spatially in such a manner that all associated group apertures of the individual configuration groups together form a common, coherent aperture without gaps.

6. The method according to claim 1, wherein an image of the object is reconstructed for every individual configuration group.

7. The method according to claim 6, wherein for every configuration group, the image is reconstructed for spatial points of a predefined, always identical spatial grid.

8. The method according to claim 5, wherein the microwave signals measured in an overlapping region of the apertures of several configuration groups are weighted with a weighting factor.

9. The method according to claim 1, wherein a reflector element is arranged near to the antenna arrangement, parallel to an edge of one or more transmitting clusters and/or perpendicular to an aperture plane of a configuration group, and the microwave signals reflected from the reflector element are interpreted and reconstructed as measured from virtual transmitting antennas of a reflected transmitting cluster.

10. A device for measurement of microwave signals, comprising:
    an antenna arrangement;
    a control unit; and
    an evaluation unit, wherein the antenna arrangement includes several antenna clusters, and in each case an antenna cluster includes several transmitting antennas and several receiving antennas,
    wherein the control unit is embodied in such a manner that a subset of the antenna clusters can be allocated to a configuration group, at least one subset of the antenna cluster of the configuration group can be configured as a receiving cluster by activating the receiving antennas of the respective antenna cluster, at least one subset of the antenna clusters of the configuration group can be configured as a transmitting cluster by activating the transmitting antennas of the respective antenna cluster, and
    wherein the evaluation unit is embodied in such a manner that the microwave signals radiated from all transmitting antennas of all transmitting clusters of the configuration group and reflected on an object are measured in every receiving antenna of the receiving clusters of the configuration group; and
    wherein the transmitting clusters and the receiving clusters of a configuration group are arranged in an arbitrary two-dimensional raster.

11. The device according to claim 10, wherein the transmitting antennas and the receiving antennas of one antenna cluster are arranged in such a manner that a totality of mid-points of paths which are plotted from every transmitting antenna of the antenna cluster to every receiving antenna of an antenna cluster form a two-dimensional raster which provides identical spacing distances in each case in one direction of extension, so that the totality of the mid-points plots an effective aperture.

12. The device according to claim 10, wherein the transmitting clusters and the receiving cluster of a configuration group are arranged in an arbitrary two-dimensional raster which provides identical spacing distances in each case in one direction of extension.

13. The device according to claim 11, wherein in one antenna cluster, the receiving antennas are arranged in two regions arranged parallel to one another, and the transmitting antennas are arranged in two parallel regions perpendicular to the receiving antennas in the form of a rectangular frame.

14. The device according to claim 11, wherein in one antenna cluster, the receiving antennas are arranged in a rectangular region, and one or more transmitting antennas are arranged in each case outside every corner of the region.

15. The device according to claim 11, wherein in one antenna cluster, the transmitting antennas are arranged in a rectangular region, and one or more receiving antennas are arranged in each case outside every corner of the region.

16. The device according to claim 11, wherein in one antenna cluster, the transmitting and receiving antennas are arranged offset relative to one another in the manner of a chessboard.

17. The device according to claim 11, wherein in one antenna cluster, the transmitting antennas are arranged point symmetrically relative to a mid-point of the antenna cluster, and the receiving antennas are arranged in a same shape but rotated through 90° to the former.

18. The device according to claim 10, wherein a reflector element is arranged near to the antenna arrangement, parallel to an edge of one or more transmitting clusters and perpendicular to a group aperture plane of a configuration group, and the evaluation unit is embodied in such a manner that the microwave signals reflected from the reflector element are interpreted and reconstructed as radiated from virtual transmitting antennas of a reflected transmitting cluster.

19. The device according to claim 18, wherein the reflector element is arranged at a spacing distance which corresponds to half of a raster spacing distance between adjacent transmitting clusters from a transmitting cluster of the configuration group adjacent to the reflector element.

* * * * *